(12) United States Patent
Cheng

(10) Patent No.: US 9,135,222 B2
(45) Date of Patent: Sep. 15, 2015

(54) METHOD OF VIEWING DOCUMENT FILE AND PROJECTING THE DOCUMENT FILE BY PROJECTION APPARATUS

(75) Inventor: Lien-Fu Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 329 days.

(21) Appl. No.: 13/467,052

(22) Filed: May 9, 2012

(65) Prior Publication Data

US 2013/0024182 A1    Jan. 24, 2013

(30) Foreign Application Priority Data

Jul. 20, 2011    (CN) .......................... 2011 1 0210810

(51) Int. Cl.
G06F 17/20    (2006.01)

(52) U.S. Cl.
CPC ....................... *G06F 17/20* (2013.01)

(58) Field of Classification Search
CPC . G06F 17/275; G06F 17/3028; G06F 17/289; G06F 9/4448
USPC ............................................................ 704/8
See application file for complete search history.

(56) References Cited

U.S. PATENT DOCUMENTS

| | | | |
|---|---|---|---|
| 7,447,624 B2* | 11/2008 | Fuhrmann ........................ 704/8 |
| 2003/0038810 A1* | 2/2003 | Emberling .................... 345/540 |
| 2004/0015408 A1* | 1/2004 | Rauen et al. .................... 705/26 |
| 2004/0080512 A1* | 4/2004 | McCormack et al. ........ 345/543 |
| 2005/0060378 A1* | 3/2005 | Girard et al. .................. 709/206 |
| 2006/0156278 A1* | 7/2006 | Reager .......................... 717/104 |
| 2010/0023311 A1* | 1/2010 | Subrahmanian et al. ......... 704/2 |
| 2010/0274839 A1* | 10/2010 | Chiu et al. .................... 709/203 |

FOREIGN PATENT DOCUMENTS

| | | |
|---|---|---|
| CN | 1632800 A | 6/2005 |
| CN | 1756302 A | 4/2006 |
| CN | 101751200 A | 6/2010 |
| TW | 578094 | 3/2004 |

OTHER PUBLICATIONS

"Office Action of China Counterpart Application", issued on Sep. 28, 2014, p. 1-p. 8.

* cited by examiner

*Primary Examiner* — Jakieda Jackson
(74) *Attorney, Agent, or Firm* — Jianq Chyun IP Office

(57) ABSTRACT

A method for viewing a document file and a projection apparatus using the method are provided. The method is suitable for a projection apparatus which has a built-in file viewer. In the method, multi-lingual word banks supported by the projection apparatus are grouped to obtain a plurality of language groups. Each of the language groups shares at least one of the word banks. One of the language groups is linked in response to an input condition, and the linked language group is provided to the file viewer for performing a loading operation, so as to allow the file viewer to view the document file.

13 Claims, 3 Drawing Sheets

The number of the supportable
languages of the word banks : 1~20

Group 1: 1~15
Group 2: 6~20

The number of the supportable
languages of the word banks : 1~30

Group 1: 1, 2, 3, 4, 5, 6, 7, 8, 9, 10, 11, 20, 21, 26, 27
Group 2: 9, 10, 11, 12, 13, 14, 15, 16, 17, 18, 19, 20, 21, 26, 27
Group 3: 4, 5, 6, 7, 8, 21, 22, 23, 24, 25, 26, 27, 28, 29, 30

METHOD OF VIEWING DOCUMENT FILE AND PROJECTING THE DOCUMENT FILE BY PROJECTION APPARATUS

CROSS-REFERENCE TO RELATED APPLICATION

This application claims the priority benefit of China application serial no. 201110210810.6, filed on Jul. 20, 2011. The entirety of the above-mentioned patent application is hereby incorporated by reference herein and made a part of this specification.

BACKGROUND OF THE INVENTION

1. Field of the Invention

The invention relates to a technique of viewing a document file. More particularly, the invention relates to a method of viewing a document file through a projection apparatus and a projection apparatus using the method.

2. Description of Related Art

Most projectors on the market cannot be applied to directly view and project files including Microsoft Office files, e.g., Word files, Excel files, PowerPoint files, and so forth. Generally, a projector can project the contents of a Microsoft Office file through three different ways as indicated below.

1. The Microsoft Office file is decoded by a computer (e.g., a notebook computer or a personal computer), and the decoded file is transmitted via a signal transmission line (e.g., a VGA transmission line or an HDMI transmission line) to the projector for projection.

2. The Microsoft Office file is converted by a computer into a certain format that can be decoded by the projector, and the converted file is transmitted to the projector for decoding and projecting actions.

3. A file viewer or an Office reader is built in the projector, such that the projector can view and project the contents of the Microsoft Office file by means of the file viewer.

As for the third way mentioned above, due to restrictions imposed by the file viewer itself or by the projector hardware (e.g., insufficient memory capacity or processing power from a processing core), multi-lingual word banks respectively containing different languages supportable by the projector cannot be simultaneously loaded on the file viewer. As such, given that a certain Word file contains a word bank that is not loaded on the file viewer, the file viewer is not able to read the contents of the Word file, such that the projector cannot correctly project the contents of the Word file. For instance, when a certain Word file simultaneously contains Chinese texts, English texts, and Japanese texts, for instance, and only the Chinese and English word banks can be loaded on the file viewer based on the above-mentioned restrictions, the file viewer cannot read the Japanese texts of the Word file, and accordingly the projector is incapable of projecting the Japanese texts of the Word file.

On the other hand, Taiwan Patent No. 578094 relates to support multi-lingual language when the memory space is limited. However, as described in this patent, only a single language data/word bank can be loaded at one time, and accordingly the simultaneous loading of multi-lingual data/word banks is still not possible.

SUMMARY OF THE INVENTION

The invention is directed to a method of viewing a document file and a projection apparatus using the same, so as to significantly decrease the likelihood that the projector apparatus cannot correctly project contents of the document file.

Other features and advantages of the invention may be further comprehended from the technical features disclosed in the invention.

To achieve one of, a part of or all of the above-mentioned objectives, or to achieve other objectives, an embodiment of the invention provides a method of viewing a document file. The method is suitable for a projection apparatus which has a built-in file viewer. In the method, multi-lingual word banks supported by the projection apparatus are grouped to obtain a plurality of language groups. Each of the language groups shares at least one of the word banks. One of the language groups is linked in response to an input condition, and the linked language group is provided to the file viewer for performing a loading operation, so as to allow the file viewer to view the document file.

According to an embodiment of the invention, the input condition may be one of the word banks. Accordingly, on the premise that the language groups respectively correspond to one option, the method of viewing the document file further includes when linking at least two of the language groups in response to the input condition, linking a corresponding language group of the language groups according to one of the options.

In another embodiment of the invention, a projection apparatus that includes a memory, a file viewer, and a processing core is provided. The memory is adapted for storing a plurality of language groups. The language groups cover multi-lingual word banks supported by the projection apparatus, and each of the language groups shares at least one of the word banks. The processing core is coupled to the memory and linked to the file viewer. The processing core is adapted for linking one of the language groups in response to an input condition and for providing the linked language group to the file viewer for performing a loading operation, so as to allow the file viewer to view a document file.

According to an embodiment of the invention, the input condition may be one of the word banks. Hence, on the premise that the language groups respectively corresponds to one option, when the processing core links at least two of the language groups in response to the input condition, the processing core further links a corresponding language group of the language groups according to one of the options.

According to an embodiment of the invention, the language groups are obtained by grouping all of the word banks according to a restriction condition associated with the projection apparatus.

According to another embodiment of the invention, in a condition of that the language groups respectively correspond to one option, the input condition may be one of the options which respectively correspond to the language groups.

According to an embodiment of the invention, the options at least include a default option and a custom option, one of the language groups corresponding to the default option is the default language group, and one of the language groups corresponding to the custom option is the custom language groups.

According to an embodiment of the invention, the restriction condition includes maximum processing capability of the processing core of the projection apparatus and/or maximum capacity of the memory of the projection apparatus.

According to an embodiment of the invention, all of the word banks in each of the language groups do not conflict.

As described in the embodiments of the invention, subject to the maximum processing capability of the processing core of the projection apparatus and/or the maximum capacity of the memory of the projection apparatus, the multi-lingual word banks supported by the projection apparatus are grouped into a plurality of language groups, and it is desirable for the word banks of different language groups to be overlapped. The more the overlapped word banks, the better the file viewer may read the document file. Thereby, the processing core in the projection apparatus may link one of the language groups in response to the input condition of a user and provide the linked language group to the file viewer for performing a loading operation, such that the file viewer may view the document file. The language group linked and provided by the processing core is determined based on the user's choice (e.g., reading capability and interest of the user), and therefore the possibility that the projection apparatus cannot correctly project the contents of the document file could be significantly reduced.

In order to make the aforementioned features and advantages of the invention comprehensible, several embodiments accompanied with the drawings are described in detail below. The above general descriptions and following embodiments are only for explanation and presented as examples, but not intended to limit the scope of the invention.

DESCRIPTIONS OF EMBODIMENTS

Figures 1, 2A, 2B:
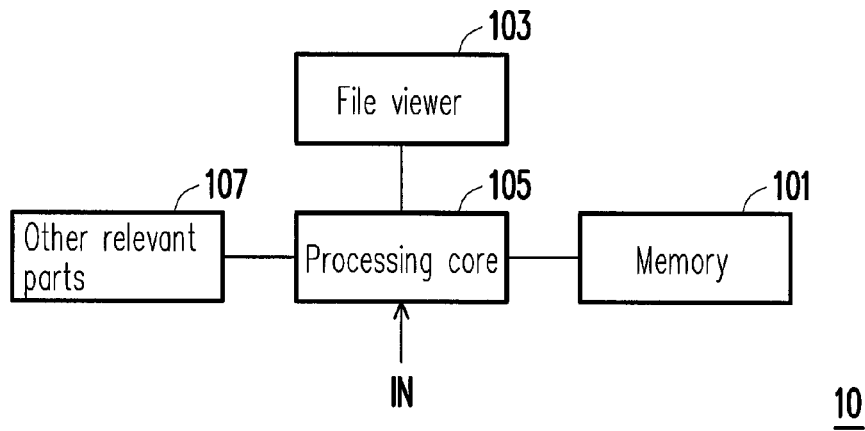
FIG. 1 is a schematic view illustrating a system of a projection apparatus 10 according to an embodiment of the invention.
FIG. 2A is a schematic view illustrating grouping multi-lingual word banks supported by the projection apparatus 10 according to an embodiment of the invention.
FIG. 2B is a schematic view illustrating grouping multi-lingual word banks supported by the projection apparatus 10 according to another embodiment of the invention.

In the following detailed description of the embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

References will now be made in detail to the exemplary embodiments of the disclosure, examples of which are illustrated in the accompanying drawings. Wherever possible, the same reference numbers are used in the drawings and the description of the embodiments to refer to the same or like parts.

FIG. 1 is a schematic view illustrating a system of a projection apparatus 10 according to an embodiment of the invention. With reference to FIG. 1, the projection apparatus 10 includes a memory 101, a file viewer 103, a processing core 105, and other relevant parts 107. The memory 101 may be any non-volatile memory for storing a plurality of language groups. The language groups cover multi-lingual word banks that respectively contain different languages and can be supported by the projection apparatus 10, and each of the language groups shares at least one of the word banks.

In this embodiment, the language groups stored in the memory 101 are obtained by grouping the multi-lingual word banks supported by the projection apparatus 10 according to a restriction condition associated with the projection apparatus 10. Here, the restriction condition includes maximum processing capability of the processing core 105 and/or maximum capacity of the memory 101. The main function of the projection apparatus 10 lies in projection. Therefore, the processing resources of the processing core 105 and the memory resources of the memory 101 are mostly allocated for the purpose of projection, and the rest resources are allocated to the file viewer 103. This is also the reason why it is unlikely to load all of the word banks stored in the memory 101 on the file viewer 103 at the same time.

In view of the above, subject to the maximum processing capability of the processing core 105 of the projection apparatus 10 and/or the maximum capacity of the memory 101 (i.e., the processing and memory resources allocated to the file viewer 103), the word banks that respectively contain different languages and can be supported by the projection apparatus 10 are grouped into a plurality of language groups, and it is desirable for the word banks of different language groups to be overlapped. The more overlapped word banks, the better file viewer may read the document file.

For instance, as shown in FIG. 2A, if the projection apparatus 10 is capable of supporting word banks in 20 languages (respectively represented by numerals 1 through 20), and the processing and memory resources that are allocated to the file viewer 103 merely allow word banks in 15 languages to be loaded on the file viewer 103 at the same time, the word banks numbered 1~15 may be grouped as [group 1], and the word banks numbered 6~20 may be grouped as [group 2]. Apparently, the number of languages in [group 1] and [group 2] is 15, respectively, and 10 languages in [group 1] and [group 2] are overlapped, i.e., the word banks numbered 6~15. It should be mentioned that the word banks in each of the language groups stored in the memory 101 cannot conflict. For instance, the word banks from the "Asian language family" and from the "Central Asian language family" cannot be grouped into the same language group, or the like.

Further, as exemplarily shown in FIG. 2B, if the projection apparatus 10 is capable of supporting word banks in 30 languages (respectively represented by numerals 1 through 30), and the processing and memory resources that are allocated to the file viewer 103 merely allow word banks in 15 languages to be loaded on the file viewer 103 at the same time, the word banks numbered 1~11, 20~21, and 26~27 may be grouped as [group 1], the word banks numbered 9~21 and 26~27 may be grouped as [group 2], and the language word banks numbered 4~8 and 21~30 may be grouped as [group 3]. Apparently, the number of languages in [group 1], [group 2], and [group 3] is 15, respectively, and three languages in [group 1], [group 2], and [group 3] are overlapped, i.e., the word banks numbered 21, 26, and 27. Similarly, all of the word banks in each of the language groups stored in the memory 101 do not conflict.

Certainly, the examples shown in FIG. 2A and FIG. 2B merely serve to explain the invention and should not be construed as limitations to the principle of grouping the multi-lingual word banks supported by the projection apparatus 10. Alternations or modifications could be properly made based on actual design requirements as long as the multi-lingual word banks supported by the projection apparatus 10 may be grouped in consideration of the restriction condition and on the premise that all of the word banks in each language group do not conflict. Here, the restriction condition refers to the maximum processing capability of the processing core 105 of the projection apparatus 10 and/or the maximum capacity of the memory 101 (i.e., the processing and memory resources that are allocated to the file viewer 103).

On the other hand, the processing core 105 is coupled to the memory 101 and linked to the file viewer 103. In this embodiment, the processing core 105 is adapted for linking one of the language groups stored in the memory 101 in response to an input condition IN and for providing the linked language group to the file viewer 103 for performing a loading operation, such that the file viewer 103 could read a certain document file (which includes but is not limited to a Microsoft Word file).

Figure 3A:
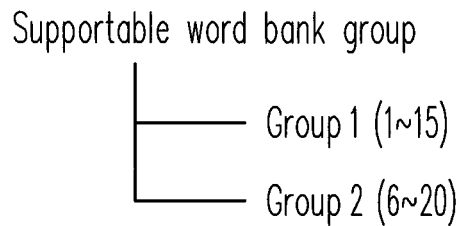
FIG. 3A is a schematic view illustrating an on-screen display (OSD) menu of the projection apparatus 10 according to an embodiment of the invention.

In this embodiment, the input condition IN could be a user's selection/input of an OSD menu of the projection apparatus 10. As indicated in FIG. 3A, the OSD menu of the projection apparatus 10 may have a (root) option named [supportable word bank groups]. Based on the grouping principle shown in FIG. 2A, the (root) option may have two (sub) options, i.e., group 1 (1~15) and group 2 (6~20). Apparently, all of the language groups which are stored in the memory 101 respectively correspond to one of the two (sub) options. Under such circumstances, the input condition IN may be one of the two (sub) options which respectively correspond to group 1 (1~15) and group 2 (6~20).

Once the user's selection/input of the OSD menu of the projection apparatus 10 corresponds to the (sub) option of group 1 (1~15), for instance, the processing core 105 could link the language group (i.e., group 1 (1~15)) stored in the memory 101 in response to the input condition IN and provide the linked language group (i.e., group 1 (1~15)) to the file viewer 103 for performing a loading operation, such that the file viewer 103 may read the Microsoft Office file.

Alternatively, once the user's selection/input of the OSD menu of the projection apparatus 10 corresponds to the (sub) option of group 2 (6~20), for instance, the processing core 105 may link the language group (i.e., group 2(6~20)) stored in the memory 101 in response to the input condition IN and provide the linked language group (i.e., group 2(6~20)) to the file viewer 103 for performing a loading operation, such that the file viewer 103 may read the Microsoft Office file.

Apparently, the language group that is linked and provided by the processing core 105 is determined based on the user's choice (e.g., reading capability and interest of the user), and therefore the possibility that the projection apparatus 10 cannot correctly project the contents of the document file may be significantly reduced.

It should be mentioned that one of the two (sub) options which respectively correspond to group 1 (1~15) or group 2 (6~20) may be a default (sub) option, while the other may be a custom (sub) option. The language group corresponding to the default (sub) option is a default language group (i.e., the default (sub) option on the OSD menu of the projection apparatus 10), and the language group corresponding to the custom (sub) option is a custom language group (i.e., the custom (sub) option set by the user who selects the required word banks in 15 languages from the word banks in 20 languages on the OSD menu of the projection apparatus 10). Apparently, the custom (sub) option which is determined based on the reading capability and interest of the user may further reduce the possibility that the projection apparatus 10 cannot correctly project the contents of the document file.

Figure 3B:
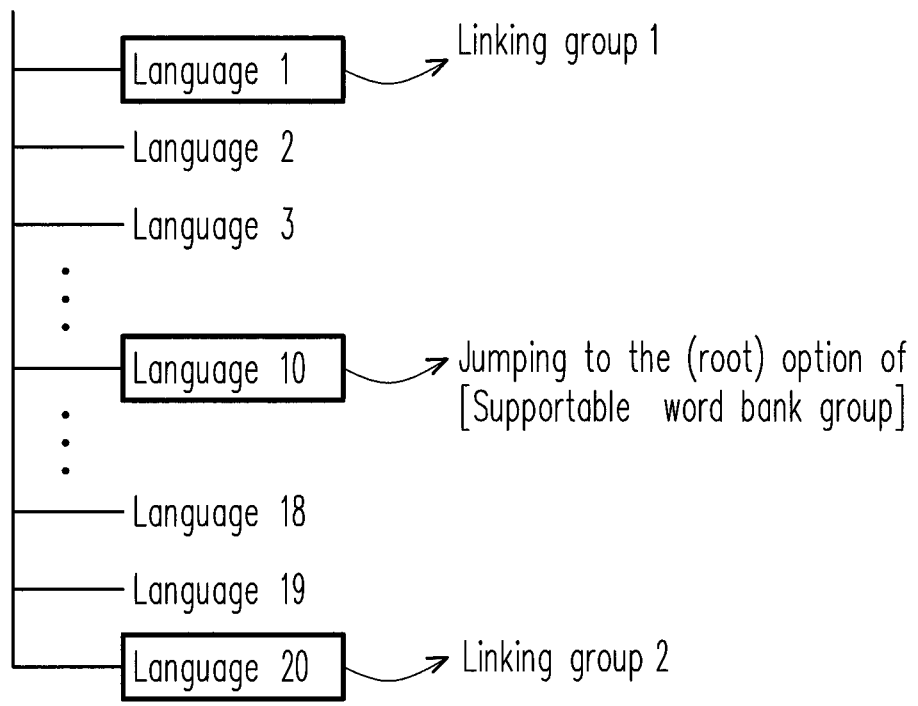
FIG. 3B is a schematic view illustrating an on-screen display (OSD) menu of the projection apparatus 10 according to another embodiment of the invention.

However, in another embodiment of the invention, as shown in FIG. 3B, the OSD menu of the projection apparatus 10 could have a (root) option of [selection of word banks]. Based on the grouping principle shown in FIG. 2A, the (root) option may have twenty (sub) options, i.e., languages 1~20. Under such circumstances, the input condition IN may be one of the twenty (sub) options which respectively correspond to languages 1~20.

Once the user's selection/input of the OSD menu of the projection apparatus 10 corresponds to one of the (sub) options of languages 1~5, for instance, the processing core 105 could link the language group (i.e., group 1 (1~15)) stored in the memory 101 in response to the input condition IN and provide the linked language group (i.e., group 1 (1~15)) to the file viewer 103 for performing a loading operation, such that the file viewer 103 may read the Microsoft Office file.

Alternatively, once the user's selection/input of the OSD menu of the projection apparatus 10 corresponds to one of the (sub) options of languages 16~20, for instance, the processing core 105 may link the language group (i.e., group 2 (6~20)) stored in the memory 101 in response to the input condition IN and provide the linked language group (i.e., group 2 (6~20)) to the file viewer 103 for performing a loading operation, such that the file viewer 103 may read the Microsoft Office file.

What is more, once the user's selection/input of the OSD menu of the projection apparatus 10 corresponds to one of the (sub) options of languages 6~15, for instance, the processing core 105 would simultaneously link the two language groups (i.e., group 1 (1~15) and group 2 (6~20)) stored in the memory 101 in response to the input condition IN. As such, the processing and memory resources that are allocated to the file viewer 103 become insufficient.

Accordingly, when the processing core 105 simultaneously link at least two language groups stored in the memory 101 in response to the input condition IN, the OSD menu of the projection apparatus 10 directly jumps to the (root) option of [supportable word bank groups] shown in FIG. 3A, such that the user may select/input one of the two (sub) options which respectively correspond to group 1 (1~15) and group 2 (6~20). Based on the user's selection/ input, the processing core 105 links the corresponding language group, and thereby the processing and memory resources which are allocated to the file viewer 103 are not insufficient. Similarly, one of the two (sub) options corresponding to group 1 (1~15) or group 2 (6~20) may be a default (sub) option, while the other may be a custom (sub) option, which is already explained in the previous embodiment and thus will not be reiterated hereinafter.

Figure 4:
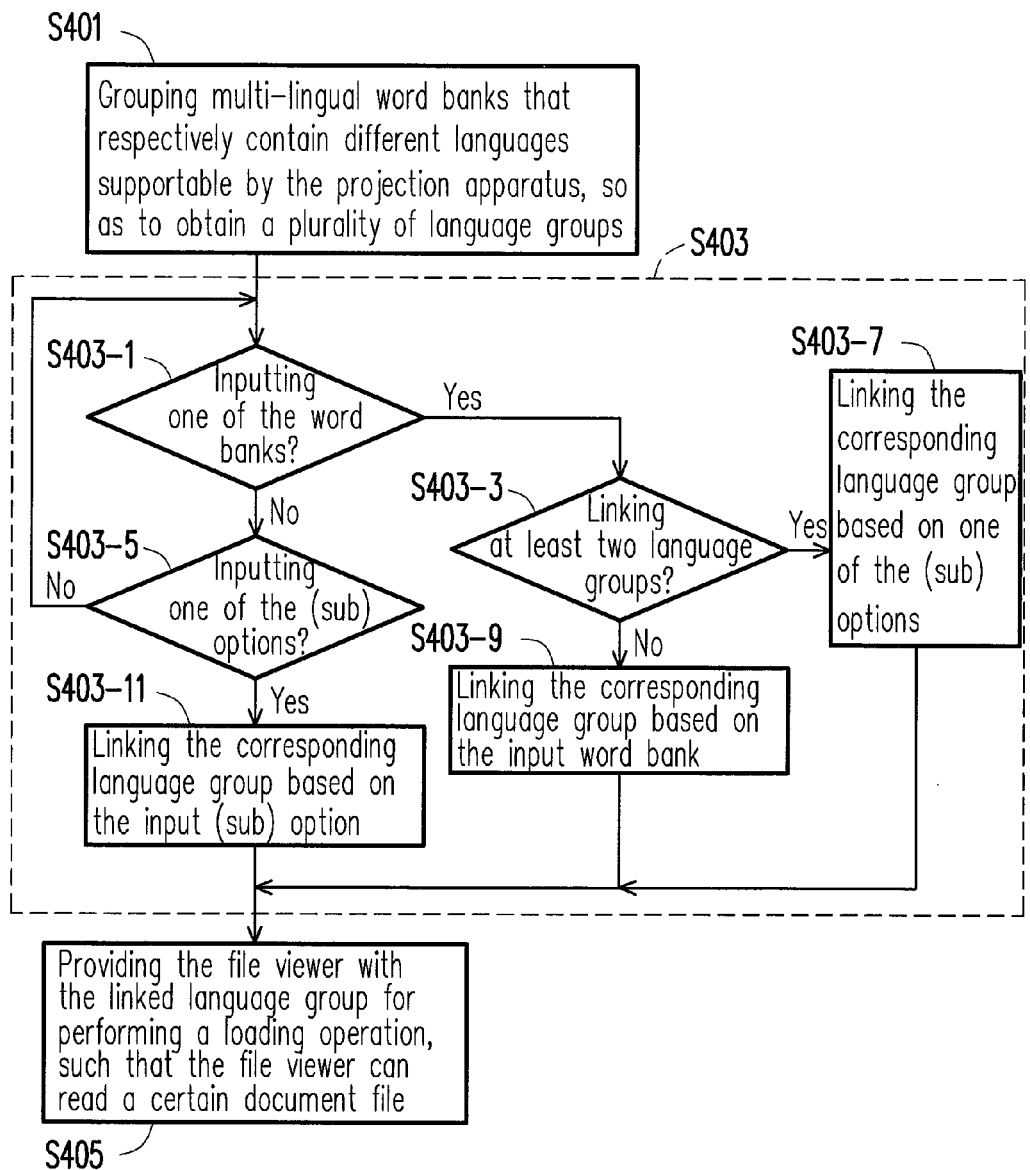
FIG. 4 is a flow chart illustrating a method of viewing a document file according to an embodiment of the invention.

In the above-mentioned embodiments of the invention, a method of viewing a common document file is provided. To be more specific, please refer to FIG. 4 which is a flow chart illustrating a method of viewing a document file according to an embodiment of the invention. As indicated in FIG. 4, the method of viewing the document file is adapted to a projection apparatus having a built-in file viewer according to this embodiment, and the method may include following processes/steps.

The multi-lingual word banks respectively containing different languages supportable by the projection apparatus are grouped based on the restriction condition (e.g., the maximum processing capability of the processing core of the projection and/or the maximum capacity of the memory of the projection apparatus) associated with the projection apparatus, so as to obtain a plurality of language groups (step S401). Here, not all of the word banks may be loaded on the file viewer at the same time. Also, each of the language groups shares at least one of the word banks, and all of the word banks in each of the language groups do not conflict.

In step S403, one of the language groups is linked in response to an input condition.

In step S405, the linked language group is provided to the file viewer for performing a loading operation, such that the file viewer could read a certain document file.

The step S403 could further include a plurality of sub-processes/sub-steps as follows.

In step S403-1, whether the input condition is one of the word banks is determined.

If the input condition is determined to be one of the word banks, whether at least two language groups are linked is determined based on the input word bank in step S403-3. By contrast, if the input condition is determined not to be one of the word banks, whether the input condition is one of the (sub) options which respectively correspond to the word banks is determined in step S403-5.

If it is determined that at least two language groups are linked, the corresponding language group is linked based on one of the (sub) options which respectively correspond to the word banks (step S403-7). By contrast, if it is determined that less than two language groups are linked, the corresponding language group is linked based on the input word bank in step S403-9.

If it is determined that the input condition is one of the (sub) options which respectively correspond to the word banks, the corresponding language group is linked based on the input (sub) option in step S403-11. By contrast, if it is determined that the input condition is not one of the (sub) options which respectively correspond to the word banks, then go back to step S403-1.

Similarly, in this embodiment, the (sub) options corresponding to all of the word banks at least include a default (sub) option and a custom (sub) option, the language group corresponding to the default (sub) option is a default language group (i.e., the default (sub) option on the OSD menu of the projection apparatus), and the language group corresponding to the custom (sub) option is a custom language group (i.e., the custom (sub) option set by the user who selects the required word banks from the multi-lingual word banks supported by the projection apparatus on the OSD menu of the projection apparatus). Apparently, the custom (sub) option is determined based on the reading capability and interest of the user, so as to significant reduce the possibility that the projection apparatus cannot correctly project the contents of the document file.

In light of the foregoing, as described in the embodiments of the invention, subject to the maximum processing capability of the processing core of the projection apparatus and/or the maximum capacity of the memory of the projection apparatus, the multi-lingual word banks that respectively contain different languages and can be supported by the projection apparatus are grouped into a plurality of language groups, and it is desirable for the word banks of different language groups to be overlapped. The more the overlapped word banks, the better the file viewer may read. Thereby, the processing core in the projection apparatus may link one of the language groups in response to the input condition of the user and provide the linked language group to the file viewer for performing a loading operation, such that the file viewer may read the document file. Since the language group which is linked and provided by the processing core is determined based on the user's choice, the possibility that the projection apparatus cannot correctly project the contents of the document file may be significantly reduced.

The foregoing description of the exemplary embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Apparently, many modifications and variations will be apparent to practitioners skilled in this art. The exemplary embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly exemplary embodiments of the invention does not imply a limitation on the invention, and no such limitation is to be inferred. The invention is limited only by the spirit and scope of the appended claims. The abstract of the disclosure and the summary of invention are provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the disclosure is intended to be dedicated to the public regardless of whether the element or component is explicitly recited in the following claims.

What is claimed is:

1. A method comprising viewing a document file and projecting the document file by a projection apparatus having a built-in file viewer adapted to open the document file, comprising:

storing, in a memory, multi-lingual word banks supported by the projection apparatus, each word bank corresponds to one language wherein the projection apparatus comprises a memory, a processing core and a part of the projection apparatus for which the file viewer stored into, wherein the memory and the part of the projection apparatus is linked to the processing core;

grouping the multi-lingual word banks to obtain a plurality of language groups, wherein each of the language groups contains at least two word banks of different languages, any two of the language groups shares at least one of the word banks, and the number of the word banks contained in each of the language groups is less than the number of the word banks supported by the projection apparatus;

projecting an on-screen display (OSD) menu by the projection apparatus;

receiving an input condition selected from the OSD menu, wherein the input condition comprising selection of at least one language;

determining, by the processing core, one of the language groups associated with the input condition from the memory;

linking, by the processing core, one of the language groups associated with the input condition from the memory to the file viewer stored in the part in response to the input condition; and loading, by the processing core, the linked language group associated with the input condition from the memory to the file viewer when the processing core receives the input condition of selecting the at least one language;

viewing the document file containing the languages in the linked language group by opening the document file; and projecting the document file.

2. The method as claimed in claim 1, further comprising determining, by the processing core, whether a word bank corresponding to the selected language is in at least two language groups.

3. The method as claimed in claim 2, further comprising receiving the input condition selected from the OSD menu by an reselection of a language group from the at least two language groups when the at least two language groups contain the same word bank corresponding to the selected language.

4. The method as claimed in claim 2, wherein the step of linking comprising linking, by the processing core, the corresponding language group having the word bank corresponding to the selected language when only one language group of the plurality of language groups contains the word bank corresponding to the selected language.

5. The method as claimed in claim 1, wherein the language groups are obtained by grouping the multi-lingual word banks according to a restriction condition associated with the projection apparatus.

6. The method as claimed in claim 5, wherein the restriction condition comprises a maximum processing capability of the processing core of the projection apparatus and/or a maximum capacity of the memory of the projection apparatus.

7. The method as claimed in claim 1, wherein the multi-lingual word banks in each of the language groups do not conflict.

8. A projection apparatus comprising:

a memory for storing a plurality of language groups, wherein the language groups cover multi-lingual word banks supported by the projection apparatus, each of the language groups contains at least two word banks of different languages, each word bank corresponds to one language, any two of the language groups shares at least one of the word banks, and the number of the word banks contained in each of the language groups is less than the number of the word banks supported by the projection apparatus;

a file viewer, wherein the file viewer is a program stored into a part of the projection apparatus and is adapted to open a document file to be projected by the projection apparatus; and a processing core, wherein the memory and the part of the projection apparatus that stores the file receiver are linked to the processing core, and the processing core is configured for determining one of the language groups and linking the one of the language groups to the file viewer in response to receiving an input condition of selecting at least one language, wherein the linked language group containing the word banks having the selected language is loaded to the file viewer when the processing core receives the input condition of selecting the language.

9. The projection apparatus as claimed in claim 8, wherein the processing core receives the input condition selected from an OSD menu.

10. The projection apparatus as claimed in claim 9, wherein the OSD menu comprises options including at least one of a default option and a custom option, one of the language groups corresponding to the default option is a default language group, and one of the language groups corresponding to the custom option is a custom language group.

11. The projection apparatus as claimed in claim 8, wherein the language groups are obtained by grouping the multi-lingual word banks according to a restriction condition associated with the projection apparatus.

12. The projection apparatus as claimed in claim 11, wherein the restriction condition comprises a maximum processing capability of the processing core and/or a maximum capacity of the memory.

13. The projection apparatus as claimed in claim 8, wherein the multi-lingual word banks in each of the language groups do not conflict.

* * * * *